Patented Aug. 1, 1933

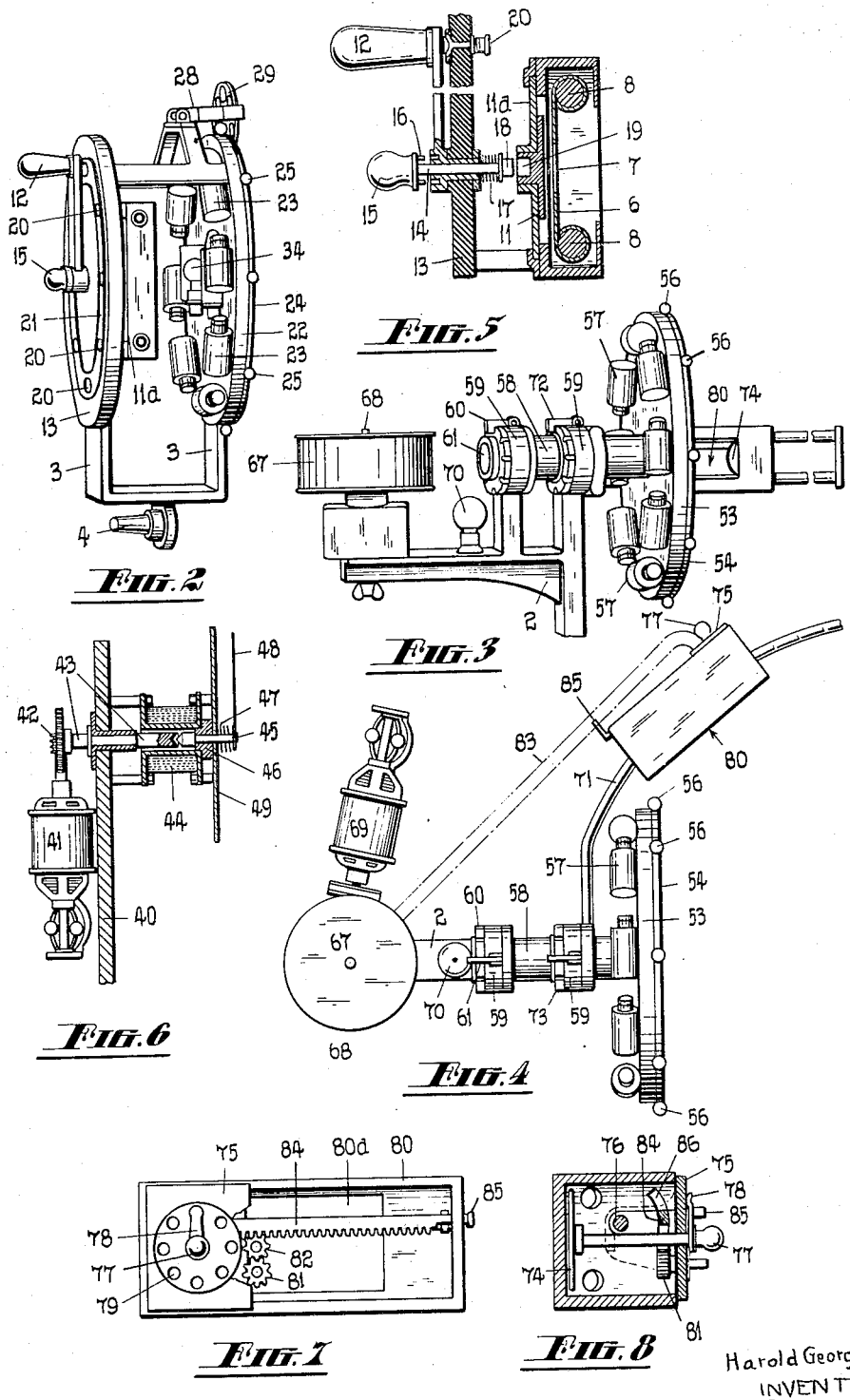

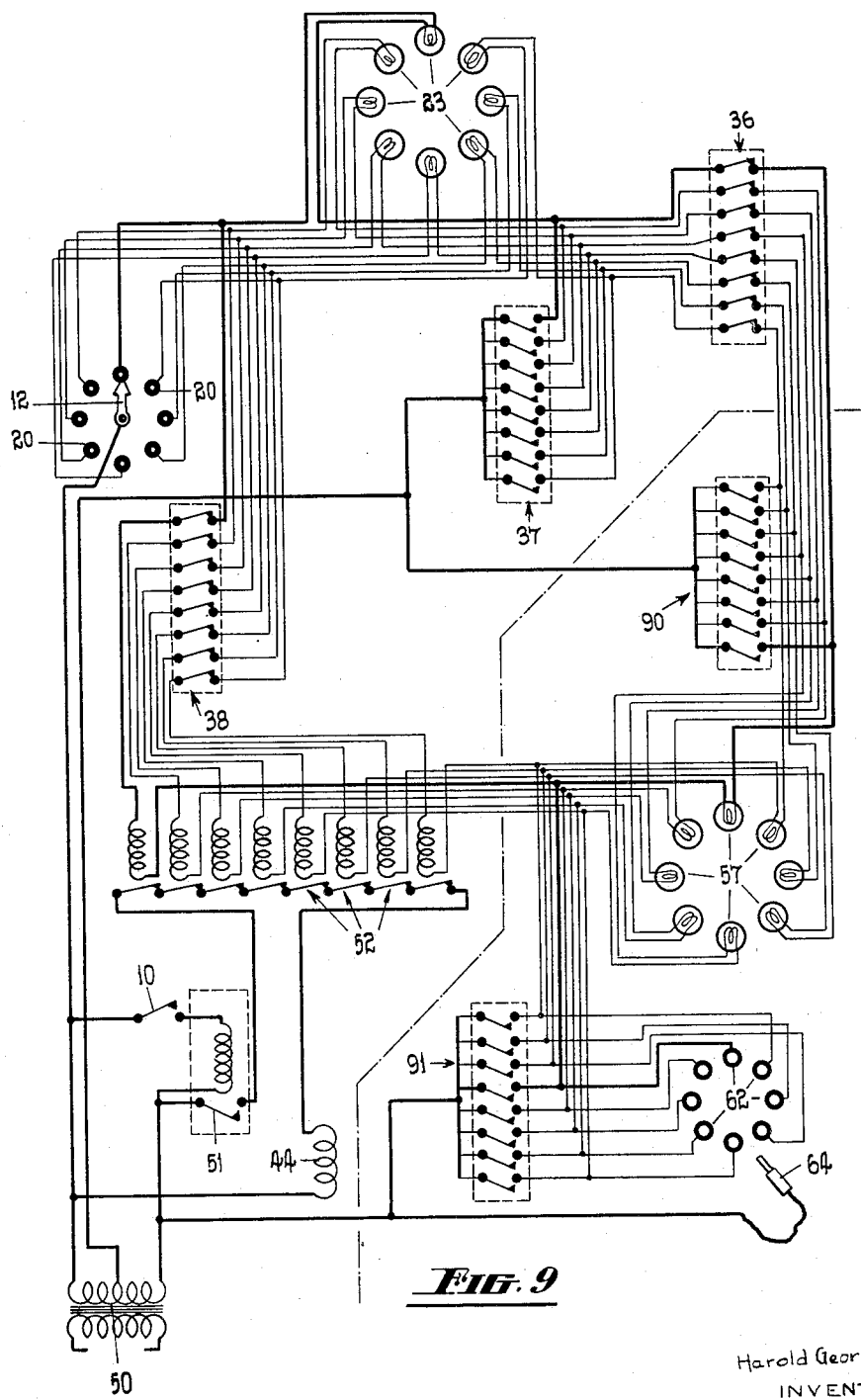

1,920,428

UNITED STATES PATENT OFFICE 1,920,428

OPTICAL TESTING APPARATUS

Harold George Pank, Adelaide, South Australia, Australia

Application September 18, 1930, Serial No. 482,755, and in Australia October 7, 1929

13 Claims. (Cl. 88—20)

This invention relates to optical testing apparatus. The more important part of the apparatus consists of what may be termed a visual reactometer. In addition, the apparatus includes means for testing visual acuity and color vision.

A serious defect of the ordinary method of testing visual acuity by means of the Snellen chart is that the time factor is not controlled. In other words, the eyes are given so long a period of observation that the test is largely vitiated by the accommodation factor. In effect, this means that the eyes are given sufficient time to accommodate to an apparent visual acuity that is not correct.

In view of the foregoing, apparatus has been proposed in which an illuminated split circle or similar convenient device has been momentarily exposed by means of a photographic shutter. By the use of the foregoing, the accommodation factor is eliminated, as the subject must observe in the limited time the position of the split in the circle, or other prominent feature. In such apparatus, the subject has been required to describe the position of the split in the circle in relation to various points of the compass, that is to say, north, east, south, north-east and so on. Such arrangement of describing the effects seen is unsatisfactory, because many persons are incapable of describing the position, although undoubtedly they see it without difficulty.

The present apparatus includes means for effecting the foregoing purpose, but it does so in an improved manner. In addition, graphical means are available to the subject to enable recording of the impression received without possibility of error through misunderstanding.

Another factor that can be investigated by means of this apparatus is what may be termed the time lag or hysteresis between the instant of perception and the recording of such perception. In many occupations and circumstances it is very important that but a short space of time should elapse between which the subject clearly sees an object and is able to take measures to act on the perception which is recorded. Thus, in driving an automobile, it is not much use if the driver clearly sees an obstacle but is unable to react in a short space of time to the perception which is recorded. In a similar manner, workmen operating on fast moving machinery must be able to give a rapid reaction to the perception of the moving parts.

The apparatus forming the subject of the present invention includes means whereby the time lag above referred to can be measured, and so will permit an accurate determination to be made of the subject's fitness for a particular occupation or the like.

The apparatus embodying the features so referred to may be termed a visual reactometer. The apparatus however also includes means for testing color vision. Summarized, the complete apparatus includes means for the following optical tests:—

(1) Acuity in contra-distinction to the apparent acuity as measured by the Snellen chart.

(2) The time lag between the instant of perception and the recording of such perception.

(3) Test for color vision.

The nature of the invention will now be referred to, the split circle being used as a suitable device for describing the invention.

It comprises broadly two parts, namely, one part positioned immediately in front of the subject, and the other or main part some distance away and incorporating the various exposure and time-recording parts which in some parts of the specification are referred to as the primary parts, and which include the main setting apparatus which records or verifies the observation made by the patient.

The main part of the apparatus includes means for holding the split circles which will be chosen of a size to suit the subject, means for illuminating the split circle, and a photographic shutter to give any desired exposure, say 0.1 of a second. Included with such apparatus is a dial or plate having, for example, eight equally spaced lamps that can be illuminated under the circumstances subsequently to be referred to. The split circle used for any particular subject is supported and can be turned to any desired position by the operator setting the position in which an electrical contact is made in one or other of the positions corresponding to the various positions of the lamps. Functioning electrically in conjunction with the button which operates the shutter will be the timing apparatus. This will conveniently consist of a continuously moving electric motor which, at the instant of operating the shutter, is, through an electro-magnet, keyed on to a recording hand which is thereupon instantaneously caused to rotate in relation to a time-indicating dial.

The part of the apparatus immediately in front of the subject includes a plurality of metallic contacts corresponding to the various lamp positions on the other part of the apparatus. These contacts may be of any convenient form. There is in addition provided a flexible lead terminating in a metal contact that in operation is to be plugged into or against one or other of the contacts above referred to.

The apparatus is operated as follows:—

A split circle of a size to suit the patient is held in position and turned to any position required. The patient is then told to watch for the exposure, and immediately the exposure occurs to plug into or against the correspondingly situated contact on the part of the apparatus in front of him. The shutter is then operated, so that the illuminated split circle is momentarily exposed, say for 0.1 of a second.

If the patient correctly perceives the split in the circle, he will be able to plug against or into the correct contact, and in doing, the sequence of the electrical circuits is such that a circuit is completed and illuminates the correct electric lamp in the apparatus.

In addition, in so doing, the hand of the timing apparatus, which was set in motion on operating the shutter, is stopped and the time taken by the subject to record the perception will be available. If the subject makes an incorrect contact, the circuits will not be completed, and a lamp will not be illuminated in the far portion of the apparatus.

It will be obvious that in testing a patient, a number of tests will be made, and from the same an average value, both for correctness of perception and for the time lag above referred to, can be obtained.

The value of the foregoing sequence of tests of central vision will be enhanced by the following means for testing the subject's intermediate and peripheral fields of vision. Obviously, a subject's vision may be quite satisfactory as far as straight-ahead objects are concerned, but may be impaired in regard to observing objects towards the periphery of the field of vision.

To provide a test for such purpose, provision can be made for having a quadrant member supported on the right and left of the peripheral field of vision to the centre of vision. Supported on the aforesaid quadrants, preferably in sliding relation thereto, will be a member or members provided with an opening facing towards the subject. Supported inside such member will be a split circle or other suitable object, provision being made whereby the split circle can be moved and held in various desired positions in a vertical plane.

The split circle is so supported that it is capable of being rotated in a horizontal plane, means such as a weight or spring being provided for such purpose. In consequence, when desired, the split circle can be caused to rotate, and will therefore appear for short intervals in line with the opening in the member.

The method of using the apparatus in question will be to slide the member in from an extreme limit beyond the peripheral limit of vision, and a stage will be reached when the subject becomes aware that there is an object. Such position will indicate the limit of his field of vision, although it will certainly not indicate that the object is seen with any degree of precision. The member is then slid further along the quadrant and the split circle rotated from time to time until a point is reached when the subject can distinguish not only the nature of the object viewed, but can also see the same with precision in regard to the position of the split in the circle, either when the circle is stationary or whilst exposed during movement. Means can be provided, such as by utilizing the plug-in devices previously alluded to, whereby the subject can record his visual impression.

It will be obvious that by reason of the foregoing arrangement, it can be determined whether the subject has a satisfactory vision on the intermediate or peripheral fields.

As previously stated, conveniently incorporated with the apparatus will be means for testing color vision. This is effected by making each of the lamps on the far part of the apparatus of a different color, and in providing correspondingly colored lamps on that part of the apparatus close to the subject, the latter lamps being, when the visual test is made, all illuminated.

In making the test, one lamp at a time is illuminated on the far portion of the apparatus, and the subject is required to indicate, without necessarily naming the color, which of such colors the illuminated lamp corresponds to in regard to the lamps placed in front of him.

It will obviously be desirable for the colored lamps on the two parts of the apparatus not to be in the same relative positions.

But in order that my invention may be more clearly understood I will now describe the same by aid of the accompanying illustrative drawings wherein similar numerals of reference are used to denote similar or corresponding parts, the setting part being referred to as the far part, and the recording apparatus as the near part.

In the drawings Fig. 1 is a front elevation perspectively drawn to illustrate the setting and the receiving or recording parts.

Fig. 2 is a side view of setting apparatus perspectively drawn showing position of shutter and illustrating apparatus on the far part.

Fig. 3 is a side view of recording apparatus perspectively drawn and provided with rotating screen carrier for width of vision test in the near part.

Fig. 4 is a plan of Fig. 3.

Fig. 5 is a sectional view of setting shutter mechanism in the far part.

Fig. 6 is a sectional side elevation of time recording mechanism on far part.

Fig. 7 is a rear view of operating mechanism for width of vision test on near part.

Fig. 8 is a cross section of Fig. 7.

Fig. 9 is the wiring diagram of the associated parts.

Figure 1:
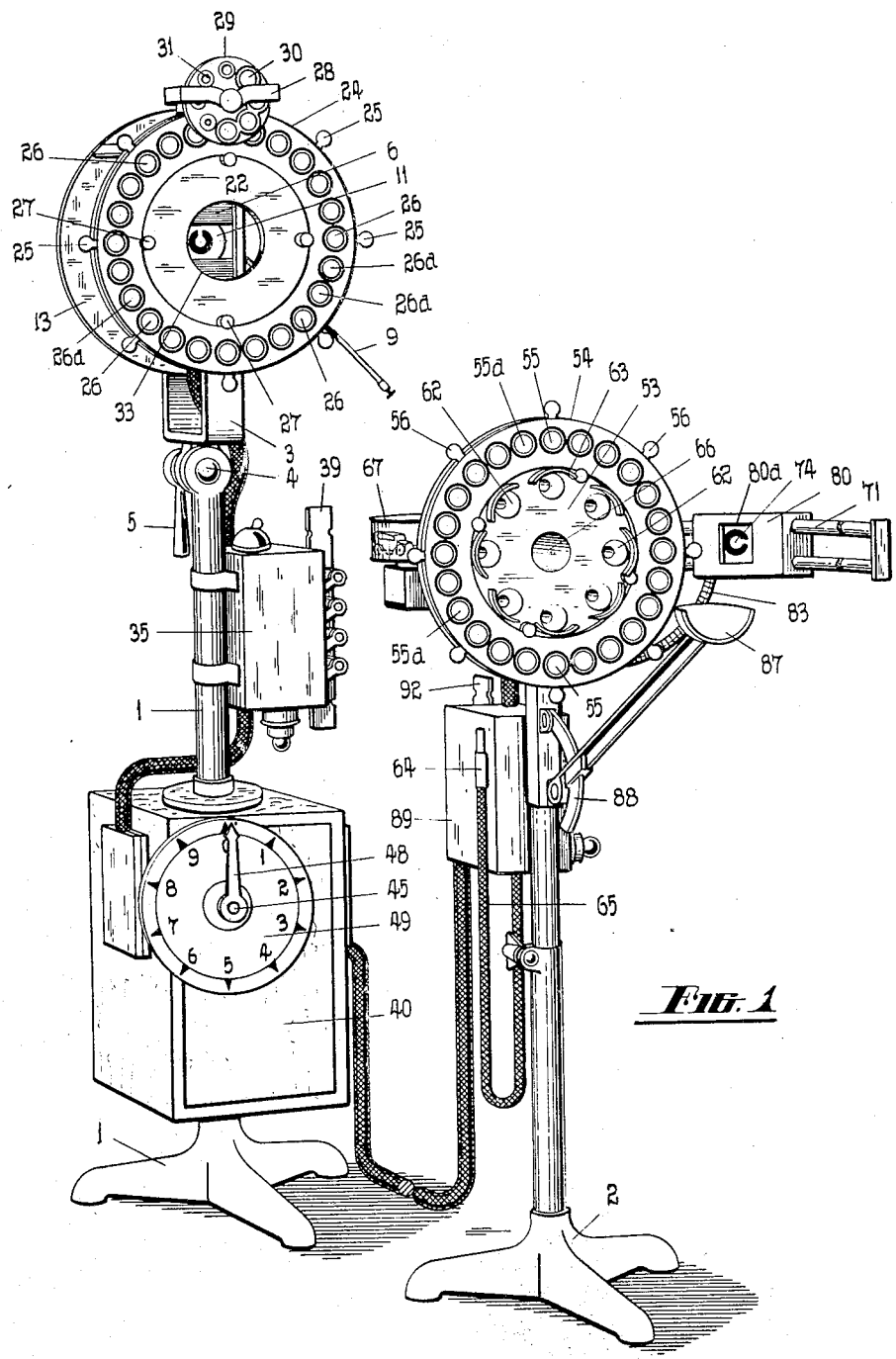

In the drawings the supporting standards of the far part and the near part of the mechanism are indicated at 1 and 2 respectively. At the top of the standard 1, I mount a frame 3, the arms of which are provided with a lug 4 which forms a horizontal axis for setting the whole of the upper mechanism at any desired angle, and is provided with a locking clamp 5.

The mechanism for sight testing comprises a shutter 6 consisting of a band of fabric with a transverse opening 7, the ends of the fabric being secured to rollers 8 of type in common use in photographic cameras.

The rollers have the usual setting and timing mechanism and are furnished with a press button release 9 also of usual type with which I also associate an electric switch 10 shown in Fig. 9.

Behind the shutter is a rotatable disc 11 upon which the split circle is illustrated. The disc is rotatably mounted within a bearing in a sliding plate 11a. This plate is withdrawn if and when a split circle of larger or smaller size is required for testing purposes. The disc 11 is rotated by means of the handle 12 carried by the rear plate 13 independently of the concentric shaft 14 which is provided with a sliding handle 15 and clutch pins 16 which are adapted to engage in holes in the handle 12, there being a spring 17 to keep them in engagement, the square 18 on the end of the shaft 14 being adapted to register with a recessed square 19 of the disc 11.

The handle 12 forms a switch arm engaging one of a series of eight contacts 20 supported in a rim 21 of insulating material attached to the rear plate 13. On the opposite or front arm of the same frame 3 I mount a fixed circular disc 22 on the back of which are eight lamps 23 within reflecting shields, and each lamp throws its light through a correspondingly placed hole in the disc 22 corresponding in position with eight equally spaced cardinal points. The rear plate 13 and front disc 22 are preferably of insulating material.

Immediately in front of and covering the outer surface of the annular face of the disc 22 I rotatably mount an annular plate 24 which is fitted with capstan bars or projections 25 whereby it can be rotated. This annular plate has a series of apertures 26 which register with the perforations in front of the lights 23.

These apertures are filled with colored glass, there being one distinctive color for each aperture.

There are, or may be, intermediate openings 26a likewise filled with colored glass, the colors being differently arranged. The annular ring is maintained in its proper position by the bearings 27.

Above the annular disc I mount a pivoted frame 28 which supports a smaller rotatable disc 29 likewise having a series of apertures therein, each of which may in turn be brought into alignment with the highest aperture of the main disc.

One set of these holes which are indicated at 30 is covered with glass of various colors so as to enable a patient to be tested with regard to intermediate colors which can thus be obtained by bringing two different colors in front of a light. The other group of apertures 31 are of diminishing size so as to produce the effect of lights at a corresponding series of greater distances.

The centre portion of the disc 22 is characterized by forming therein an aperture 33 which is immediately opposite the split circle, and at each side of this aperture I mount a lamp 34 to illuminate the split circle, reflectors being added to direct the light.

A multiple switch is indicated at 35, and this comprises three sets of four switches 36, 37 and 38 as indicated in wiring diagram Fig. 9. These switches are mechanically connected to one handle 39. Beneath this switch is a box 40 within which there is a motor 41, the spindle of which operates worm gearing 42, thus rotating the spindle 43, the other end of which terminates within the field of an electromagnet 44 and is constructed of soft iron to form an armature.

Adjacent to the end of this spindle is another spindle 45 which is rotatably and slidably mounted in a bearing 46.

The end of the spindle 45 is kept away from the end of the spindle 43 by a spring 47 until the field of the magnet is energized, whereupon the soft iron end of the spindle 43 is magnetized, drawing and holding the end of the spindle 45 against it.

Upon the end of the spindle 45 I mount a hand or pointer 48 behind which is a graduated dial 49. The motor is governed by the usual means to rotate at a constant speed, and the mechanism is designed to impart one rotation of the hand per second.

The box also contains a transformer 50 and a drop shutter switch 51, and a series of electrically controlled circuit breaker switches 52.

Referring now to the front standard 2, it will be seen that I provide constructional mechanism which may be regarded as a repetition or counterpart of some of the mechanism which is mounted on the back standard. There is a secondary annular disc 53 having eight circumferential holes, an annular ring 54 likewise furnished with holes 55 and 55a, and capstan bars 56 for rotating the ring, and a series of eight lamps 57, all these parts being substantially the same as the parts on the standard 1, except that the disc 53 is fixed upon a tubular shaft 58 which is carried by bearings 59 on the secondary standard 2.

Attached to the shaft 58 is a ring 60 having eight slots adapted to be engaged by a locking pawl 61 the pawl being pivotally mounted on the bearing 59. Adjacent to the eight lamps 57 situated at the cardinal points I form a corresponding number of cone mouthed sockets 62, each being partially surrounded by a small shield 63 connected thereto, the sockets being adapted to accommodate a jack 64 on the end of a flexible cord 65.

Instead of the central aperture 33 this part of the mechanism has an aperture 66 registering with the tubular shaft 58 which is directed to a moving exhibit to concentrate the attention of the patient for the width of vision test. It consists of a rotatably mounted drum 67 supported on a vertical spindle 68, its periphery being fitted with illustrations of motor vehicles or illustrations of other traffic, so that when the drum is rotated by a motor 69 these moving objects will appear to pass before the patient and hold his attention, there being a lamp 70 to illuminate the picture.

A vertically supported radial frame 71 is rotatably mounted by means of a sleeve around the tubular bearing 58, within the fixed bearing 59, and may be locked at any angle by means of a locking pawl 72 which engages in the slotted ring 73 secured to the sleeve. The arm 71 is graduated to facilitate reading of the angle of vision.

Upon the radial arm I mount a sliding box 80. This box contains a disc 74 upon which the split circle is displayed, the circle being rotatably mounted in a frame 75, the frame being slidably mounted on the rod 76. The disc is rotated by a handle 77 and held in place by a spring arm 78 which engages one of the setting holes 79. The box has an opening 80a in the centre of its front face through which the slotted circle can be viewed when the frame 75, and consequently the disc 74, is adjacent to the centre of the box.

The slotted circle is caused to pass across the aperture by means of a pair of small toothed wheels 81 and 82 which are mounted upon and carried by the frame 75; the lower toothed wheel 81 is operated by a flexible driving connection 83 to the motor 69. The upper toothed wheel 82 engages a rack 84 extending across the box, both ends of the rack being bent back and pivoted to the rod 76, there being an extension 85 which projects through a slot 86 inside of the box.

To keep the patient at a suitable distance from the instrument I provide an adjustable chin rest 87 which is hinged to the secondary standard 2 and may be elevated to any suitable angle and is clamped on a quadrant plate 88, the standard being also adjustable by telescopic movement.

A multiple switch is indicated at 89, and this comprises two sets of four switches 90 and 91 as indicated in the wiring diagram Fig. 9. These switches are mechanically connected to one handle 92.

I will now further describe the operation of my invention referring especially to Fig. 9 of the drawings.

The operator sets the switch arm 12 to contact with any one of the contacts 20 and places the switches 36, 37 and 38, and also the switches 90 and 91 as shown. The disc 11 has been automatically turned to have the split in the circle on its face pointing in the same direction as the switch arm 12 by its connection to such arm.

The operator now presses the shutter release 9 and the circle is exposed for the desired time. The release has also closed the switch 10 completing a circuit in which is the solenoid of a drop shutter switch 51 which switch then remains closed until its shutter is lifted by the operator after the completion of that test. The closing of the switch 51 completes a circuit through the field of the electro-magnet 44 energizing the armature 43 and connecting the hand 48 to the motor 41 which runs at a constant speed throughout the test.

The patient to be tested sits in front of the recording part of the invention, and so soon as he is satisfied as to the direction in which the split in the circle is pointing he places the jack 64 in one of the sockets 63 corresponding to that direction.

This then completes a circuit from the transformer 50 through the switch arm 12, one of the switch contacts 20, one of the lamps 23, the switch 36, one of the lamps 57, and through one of the sockets 62, and the jack 64 back to the transformer 50. It also completes a circuit from the same switch contact 20, through the switch 38, through one of the solenoids of the breaker switch 52, and to the same socket 62 as in the other circuit.

When these circuits are completed the lamps illuminated correspond to the positions in which the switch arm, and consequently the split in the circle, is pointing, and it also stops the hand 48, by breaking the circuit in which the solenoid 44 is included. By this means the correctness of vision of the patient is recorded as also is the time taken by the patent to record same.

Should the patient place the jack 64 in the wrong socket no circuit will be completed, but all the lamps will remain unilluminated, and the hand will continue to record the time.

When the color test only is to be used the switches 36, 37, 38, 90 and 91 are set to a position opposite to that shown in Fig. 9. This then enables a circuit to be completed from the transformer 50 through the switch arm 12, one of the contacts 20, and through one of the lamps 23, back to a centre tap on the transformer 50.

The lamps 57 are in this case all illuminated at the same time by being connected in parallel with one half of the transformer 50.

What I claim is:

1. In an optical testing apparatus, a fixed circular disc having a central aperture therein, a series of lamps mounted at the back thereof, said disc having a series of holes corresponding to the number of lamps, a rotatable annular plate having a series of apertures therein which register with the holes in the said disc; colored glass plates fitted in the apertures of the said annular plate; bearings for supporting the annular plate, and means for rotating the latter.

2. Optical testing apparatus comprising a support, a rotatably mounted plate on said support bearing a direction indicating marker, a plurality of lamps arranged at fixed points on said support and about said plate, means for rotating said plate to cause said marker to point to one of said lamps, means for exposing said marker to the patient for a limited period of time, a second support, a second set of lamps arranged at points on said support corresponding to the arrangement of said first set of lamps, said second support having sockets leading to the lamps thereon, means joining a lamp of one set in an electric circuit with a corresponding lamp of another set and a plug on said second support adapted to be inserted by the patient into the socket of a lamp corresponding to that indicated by said direction marker to complete the circuit between said lamps and cause their illumination, no circuit being completed if the patient fails to insert the plug in the proper socket.

3. Optical testing apparatus comprising a support, a plate rotatably mounted on said support and bearing a direction indicating marker, a set of lamps on said support arranged at points on the circumference of a circle, means for rotating said plate to cause the object thereon to point to one of said lamps, means for exposing said object to a patient for a limited period of time, a second support, a second set of lamps on said support arranged at similar points as said first set, on the circumference of a circle, said second support having sockets leading to said lamps, means for electrically connecting a lamp of one set in a circuit with a corresponding lamp of said other set and a plug on said second support adapted to be inserted by the patient into the socket of the lamp corresponding to that of the first set indicated by the object on said plate to thereby close the circuit between said lamps and cause their illumination, no circuit being completed if the patient fails to insert the plug in the proper socket.

4. An optical testing device comprising a support, a disc bearing a direction indicating marker, rotatably mounted on said support, a set of lamps arranged at fixed points on said support and about said disc, means for rotating said disc to cause said marker to indicate a lamp, a shutter in front of said disc, means for releasing said shutter to expose said disc to a patient, time indicating means on said support, electrical means for operating said time indicating means, said electrical means being controlled by said shutter releasing means, a second support, a set of lamps on said support mounted to correspond to the arrangement of said first set of lamps, said second support having sockets leading to said second set of lamps, electrical connections for joining a lamp of one set in a circuit with a lamp of another set, a plug for insertion by the patient into a socket of a lamp corresponding to that indicated by said marker to complete the circuit between said lamps and cause their illumination, no circuit being completed if the plug is inserted in the wrong socket, and means operative upon the completion of said circuit to stop said time indicating means.

5. Optical testing apparatus comprising a support, a rotatably mounted plate on said support bearing a direction indicating marker, a set of lamps situated at fixed points on said support and about said plate, means for rotating said plate to cause said marker to indicate one of said lamps, a shutter mounted in front of said plate, a time graduated dial on said support, a pointer, power means for rotating said pointer at a constant speed, means including an electromagnet normally out of operation for connecting said pointer and power means, an electric circuit joining said lamps, electro-magnet and current source, means for releasing said shutter to expose said plate to a patient for a limited time, said means completing said electric circuit and causing the energization of said electromagnet to thereby couple said power means and pointer, a second support, a second set of lamps arranged on said support at points corresponding to the arrangement of said first set of lamps, said second support having sockets leading to said lamps, means for electrically connecting a lamp of one set in a circuit with a lamp of another set, a plug adapted to be inserted by the patient into the socket of a lamp corresponding to that indicated by said direction marker to thereby complete the circuit between said lamps and cause their illumination, no circuit being completed if the plug is not inserted in the proper socket, and means operative upon the completion of said circuit to break said first circuit and detach the power means from said pointer.

6. An optical testing apparatus comprising a support, a circular plate having a central aperture mounted on said support, a disc having a split circle rotatably mounted on said support so as to be observed through the aperture in said plate, a shutter adapted to normally cover said aperture, a set of lamps arranged at fixed points around the circumference of said plate, means for rotating said disc to cause the split circle to point to one of said lamps, means for releasing said shutter to expose said disc to a patient for a limited period of time, time indicating means on said support, electrical means for operating said time indicating means, said electrical means being controlled by the means for releasing said shutter, a second support, a plate on said support bearing a set of lamps arranged in position to correspond to the arrangement of the lamps on said first support, said plate having sockets leading to said lamps, electric connections for joining a lamp of one set to a corresponding lamp of another set, a plug for insertion by the patient into a socket of a lamp corresponding to the lamp indicated by said split circle to complete the circuit between said lamps and cause their illumination, no circuit being completed if the patient inserts the plug in the wrong socket, and means operative upon the completion of said circuit to stop said time indicating means.

7. In an optical testing device, a support, a case mounted on said support, a bearing in the rear wall of said case, a disc having a direction indicating marker on its front face, a stud on the rear face of said disc mounted in said bearing, a socket in said stud, a rotatable radial shaft journalled in the support opposite said bearing, a handle slidably mounted in the journal of said shaft, one end of said handle having an end adapted to be received in the socket of said disc, a spring retaining said end in said socket, a clutch for releasably joining said handle and shaft whereby to effect rotation of said disc, and a releasable shutter in said case in front of said disc.

8. In an optical testing apparatus, a fixed circular plate having a central aperture therein, a plurality of lamps secured to the rear of said plate, said plate having a plurality of openings adjacent said lamps, an annular plate rotatably mounted on said fixed plate, said second plate having a plurality of apertures corresponding to the apertures in said fixed plate and additional apertures therebetween, the apertures in said rotatable plate bearing glass plates of varying color.

9. A device as recited in claim 8 including a frame pivoted to the top of said fixed plate, a disc rotatably mounted on said frame, said disc having a plurality of sets of apertures, each of which is adapted to be brought into alignment with the upper-most aperture of said fixed plate, the apertures of one set bearing colored glass plates and the apertures of the other set having diameters of varying size.

10. In an optical testing apparatus, a device for recording the time of exposure of an object to a patient comprising, an object to be viewed, means for exposing said object, a graduated dial, a support for said dial, a dial pointer, a spindle slidably journalled in said support and attached to said dial, a second spindle of soft iron opposite said first spindle and having one end connected to a source of power, a socket on the end of said second spindle facing said first spindle, spring means for maintaining said spindles out of contact, an electromagnet surrounding the socketed end of said second spindle, and electrical connections controlled by the means for exposing said object to energize said electro-magnet and thereby cause a coupling of said spindles.

11. In an optical testing device, a support, a centrally apertured disc on said support, a plurality of lamps secured to the back of said disc, an object to be viewed located behind said central aperture, said disc having a plurality of apertures adjacent said lamps, an annular plate rotatably mounted on said disc, said plate having a plurality of apertures bearing colored glass, certain of said apertures overlying the apertures in said disc, a second support, a hollow shaft, a disc on said shaft, a plurality of lamps on said disc, said disc having apertures corresponding to those on said first disc, an annular plate rotatably mounted on said disc and having apertures arranged like the apertures in said first annular plate and bearing colored glasses and means for illuminating said lamps.

12. A device as recited in claim 11 including a rotatable drum secured to the second support adjacent the inner end of said hollow shaft and bearing markings adapted to be seen through said shaft, a radial arm rotatably mounted on said shaft, means for locking the arm at a desired angle, sliding means on said arm containing an object to be viewed and graduated means on the arm for recording the angle of vision.

13. In an optical testing device, means for measuring the angle of vision comprising a support, means fixed thereon to cause the patient to focus his eyes to the front, a radial arm rotatably mounted on said support, a sliding box on said radial arm, said box having an aperture in the front thereof, a disc bearing marking indicia rotatably mounted in said box so as to be observed through said aperture, means for rotating said disc, means for locking the disc in position, means for moving the disc from one end of the box to the other and calibrations on said radial arm.

HAROLD GEORGE PANK.